(12) United States Patent
Chia (10) Patent No.: US 9,467,644 B2
(45) Date of Patent: Oct. 11, 2016

(54) VIDEO PROCESSING SYSTEM, VIDEO PROCESSING METHOD, AND PROGRAM

(71) Applicant: Rakuten, Inc., Tokyo (JP)

(72) Inventor: Alex Yong-Sang Chia, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/781,031

(22) PCT Filed: Mar. 29, 2013

(86) PCT No.: PCT/JP2013/059731
§ 371 (c)(1),
(2) Date: Sep. 29, 2015

(87) PCT Pub. No.: WO2014/155729
PCT Pub. Date: Oct. 2, 2014

(65) Prior Publication Data
US 2016/0057381 A1   Feb. 25, 2016

(51) Int. Cl.
*H04N 5/92* (2006.01)
*H04N 5/913* (2006.01)
*G09G 5/00* (2006.01)
*G09G 5/36* (2006.01)
*G06K 9/00* (2006.01)
*G09G 5/397* (2006.01)

(52) U.S. Cl.
CPC .......... *H04N 5/913* (2013.01); *G06K 9/00744* (2013.01); *G09G 5/006* (2013.01); *G09G 5/363* (2013.01); *G09G 5/397* (2013.01); *G09G 2320/0285* (2013.01); *G09G 2320/10* (2013.01); *H04N 2005/91357* (2013.01); *H04N 2005/91364* (2013.01)

(58) Field of Classification Search
CPC ...... G09G 5/006; G09G 5/363; G09G 5/397; G09G 2320/0285; G09G 2320/10; H04N 2005/91357; H04N 5/913; H04N 2005/91364; G06K 9/00744
USPC .......................................................... 386/254
See application file for complete search history.

(56) References Cited

U.S. PATENT DOCUMENTS

| 6,560,281 B1* | 5/2003 | Black | G06F 17/30793 345/158 |
| 2012/0308075 A1* | 12/2012 | Takenaka | G06F 21/10 382/100 |
| 2014/0365893 A1* | 12/2014 | Gao | G06F 3/0488 715/719 |

FOREIGN PATENT DOCUMENTS

JP   2002-072994 A   3/2002

*Primary Examiner* — William Tran
(74) *Attorney, Agent, or Firm* — Hubbs, Enatsky & Inoue PLLC (57) ABSTRACT

To make it difficult to acquire an original moving image based on display data. A moving image processing system includes a moving image data acquiring unit for acquiring moving image data, a frame image set specifying unit for specifying an image set that includes, among a plurality of frame images indicated by the moving image data, frame images to be displayed sequentially, and a modified frame image generating unit for generating, by modifying a key frame image that is based on at least one of the frame images included in the image set, a same number of modified frame images as the frame images included in the image set, wherein an average of pixel values of corresponding pixels of the modified frame images corresponds to a pixel value of a corresponding pixel of the key frame image, and a display control unit for sequentially display the modified frame images generated by modified frame image generating unit, instead of the frame images included in the image set.

11 Claims, 10 Drawing Sheets

VIDEO PROCESSING SYSTEM, VIDEO
PROCESSING METHOD, AND PROGRAM

CROSS REFERENCE TO RELATED
APPLICATIONS

This application is a National Stage of International Application No. PCT/JP2013/059731 filed on Mar. 29, 2013. The contents of the above document is incorporated herein by reference in its entirety.

TECHNICAL FIELD

The present invention relates to a moving image processing system, a moving image processing method, and a program.

BACKGROUND ART

An image displayed on a screen of an information processor can be copied by taking a screen shot. That is, data of the image displayed on the screen can be obtained by capturing display data stored in the display memory.

In an attempt to prevent such fraudulent acts, Patent Literature 1 below discloses a technology for randomly selecting S for each pixel of an original image, generating a first converted image obtained by adding S to each pixel value and a second converted image obtained by subtracting S from each pixel value, and displaying these two converted images while switching them at a high speed. In accordance with this technology, even though a viewer recognizes as if the original image is displayed, it is possible to prevent fraudulent acquisition of original image data because the data obtained by a screen shot is the first or the second converted image.

CITATION LIST

Patent Document

Patent Literature 1: JP2002-72994A

SUMMARY OF INVENTION

Technical Problem

However, the technology described in the Patent Literature 1 is directed to a still image, and could not be applied to a moving image.

One or more embodiments of the present invention have been conceived in view of the above, and an object thereof is to provide a moving image processing system, a moving image processing method, and a program that make it difficult to obtain an original moving image based on display data.

Solution to Problem

In order to solve the above described problems, a moving image processing system according to the present invention includes acquiring means for acquiring moving image data, specifying means for specifying an image set that includes, among a plurality of frame images indicated by the moving image data, frame images to be displayed sequentially, and generating means for generating, by modifying a key frame image that is based on at least one of the frame images included in the image set, a same number of modified frame images as the frame images included in the image set. An average of pixel values of corresponding pixels of the modified frame images corresponds to a pixel value of a corresponding pixel of the key frame image. The modified frame images are sequentially displayed instead of the frame images included in the image set.

The moving image processing system according to the present invention includes acquiring means for acquiring moving image data, specifying means for specifying an image set that includes, among a plurality of frame images indicated by the moving image data, frame images to be displayed sequentially, and generating means for generating a same number of noise images as the frame images included in the image set, the noise images being combined with a key frame image that is based on at least one of the frame images included in the image set. An average of pixel values of corresponding pixels of the noise images is zero. The modified frame images, which are obtained by combining the key frame image with the noise images respectively, are sequentially displayed instead of the frame images included in the image set.

The specifying means may specify the image set based on a change in the frame images indicated by the moving image data. Further, the specifying means may specify the image set based on content of the frame images indicated by the moving image data.

The moving image processing system may further include pausing means for repeating, in a case where reproducing the moving image data is paused while the modified frame images are sequentially displayed, displaying a plurality of pause modified frame images for use in pausing in order, the pause modified frame images being obtained by modifying a pause key frame image for use in pausing that is based on at least one of the frame images included in the image set, wherein an average of pixel values of corresponding pixels of the pause modified frame images corresponds to a pixel value of a corresponding pixel of the pause key frame image.

The pause modified frame images may be the modified frame images generated by the generating means.

A moving image processing method according to the present invention includes an acquiring step of acquiring moving image data, a specifying step of specifying an image set that includes, among a plurality of frame images indicated by the moving image data, frame images to be displayed sequentially, and a generating step of generating, by modifying a key frame image that is based on at least one of the frame images included in the image set, a same number of modified frame images as the frame images included in the image set. An average of pixel values of corresponding pixels of the modified frame images corresponds to a pixel value of a corresponding pixel of the key frame image. The modified frame images are sequentially displayed instead of the frame images included in the image set.

A moving image processing method according to the present invention includes an acquiring step of acquiring moving image data, a specifying step of specifying an image set that includes, among a plurality of frame images indicated by the moving image data, frame images to be displayed sequentially, and a generating step of generating a same number of noise images as the frame images included in the image set, the noise images being combined with a key frame image that is based on at least one of the frame images included in the image set. An average of pixel values of corresponding pixels of the noise images is zero. The modified frame images, which are obtained by combining the key frame image with the noise images respectively, are sequentially displayed instead of the frame images included in the image set.

A program according to the present invention program causes a computer to function as acquiring means for acquiring moving image data, specifying means for specifying an image set that includes, among a plurality of frame images indicated by the moving image data, frame images to be displayed sequentially, and generating means for generating, by modifying a key frame image that is based on at least one of the frame images included in the image set, a same number of modified frame images as the frame images included in the image set. An average of pixel values of corresponding pixels of the modified frame images corresponds to a pixel value of a corresponding pixel of the key frame image. The modified frame images are sequentially displayed instead of the frame images included in the image set. Further, a program according to the present invention causes a computer to function as acquiring means for acquiring moving image data, specifying means for specifying an image set that includes, among a plurality of frame images indicated by the moving image data, frame images to be displayed sequentially, and generating means for generating a same number of noise images as the frame images included in the image set, the noise images being combined with a key frame image that is based on at least one of the frame images included in the image set. An average of pixel values of corresponding pixels of the noise images is zero. The modified frame images, which are obtained by combining the key frame image with the noise images respectively, are sequentially displayed instead of the frame images included in the image set. These programs may be stored in a computer-readable information storage medium, such as a CD-ROM and a DVD-ROM.

DESCRIPTION OF EMBODIMENTS

An embodiment of the present invention will be described below in detail with reference to the accompanying drawings.

Figure 1:
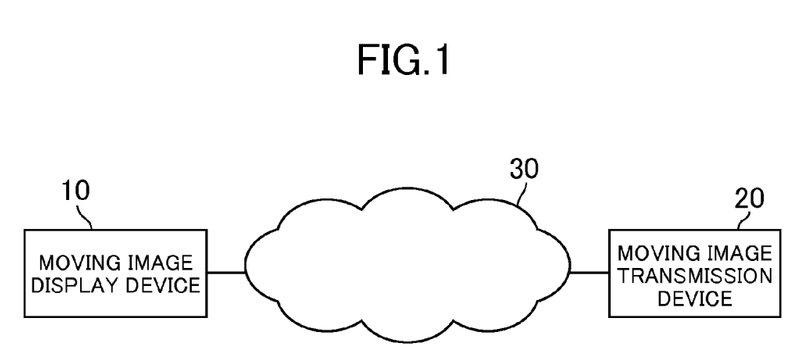
FIG. 1 is a diagram illustrating a moving image display device according to an embodiment of the present invention.
Figure 2:
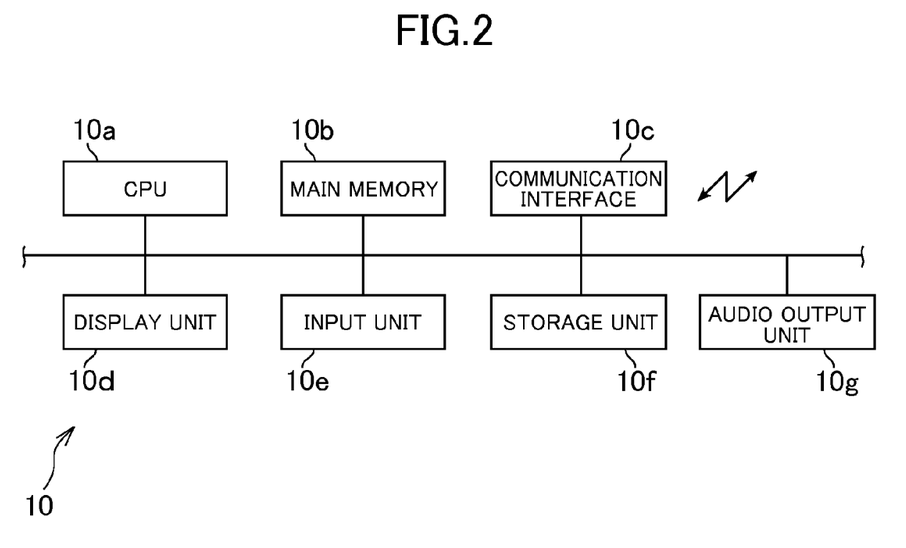
FIG. 2 is a diagram illustrating a hardware configuration of the moving image display device.

FIG. 1 is a diagram illustrating a moving image display device according to an embodiment of the present invention. The moving image display device 10 is a computer in various forms, such as a personal computer, a smartphone, and a tablet. As shown in FIG. 2, the moving image display device 10 has a hardware configuration in which a CPU 10a, a main memory 10b, a communication interface 10c, a display unit 10d, an input unit 10e, and a storage unit 10f are connected to a bus. The moving image display device 10 is one form of a moving image processing system according to the present invention. The CPU 10a controls each section of the device and executes various information processing. The main memory 10b is volatile storing means and used for operations of the CPU 10a. The communication interface 10c accesses a data communication network 30, such as the Internet, through a communication line, such as a wireless LAN and a radio telephone line. The display unit 10d is display means such as a liquid crystal display and an organic EL display. The display unit 10d includes a display memory. When the CPU 10a stores display data (raster style) in the display memory, the display unit 10d displays an image indicated in the display data. The input unit 10e is, for example, mechanical keys provided to the moving image display device 10, and a touch panel mounted on the display surface of the display unit 10d. Data input by the input unit 10e is used by the CPU 10a. The storage unit 10f is non-volatile storage means, and stores an Operating System (OS) and a moving image display program. The moving image display program may be downloaded from the data communication network 30, or read from a computer-readable information storage medium, such as a CD-ROM. An audio output unit 10g has speakers and reproduces audio data.

In this embodiment, as shown in FIG. 1, the moving image display device 10 is connected to the data communication network 30, to which the moving image transmission device 20 is also connected. The moving image transmission device 20 is a computer that has a hardware configuration similar to the moving image display device 10, and sends moving image data to the moving image display device 10. For example, the moving image display device 10 and the moving image transmission device 20 are computers each executing a video chat program and configured as a video chat device. That is, the moving image transmission device 20 captures moving image of a user with a camera, and generates moving image data of the user in a stream format. Subsequently, the moving image transmission device 20 streams the generated moving image data to the moving image display device 10. The moving image display device 10 receives the moving image data, and displays the received data on the display unit 10d. The moving image transmission device 20 may have a microphone for recording a user's voice, and send the moving image data with audio to the moving image display device 10. Further, when displaying moving image indicated by the moving image data with audio on the display unit 10d, the moving image display device 10 may output, from the audio output unit 10g, the audio indicated by the moving image data with audio in synchronization with the moving image. The moving image transmission device 20 may have functions of the moving image display device 10, and the moving image display device 10 may have the functions of the moving image transmission device 20. This can implement two-way video chatting. Applying the present invention to a video chat device can be very valuable for a user to prevent a chat partner from copying the user's image.

The moving image transmission device 20 may send not only moving image data with audio for video chatting, but also moving image data with other audio, such as recorded audio of lectures. Alternatively, moving image data may not be with audio. Further, the moving image data may be generated not only in a stream format, but also in a downloadable format. The moving image transmission device 20 may also send moving image data in an encrypted form.

An OS runs on the moving image display device 10, and the OS provides a screen shot function. With the screen shot function, when a user performs a specific operation using the input unit 10e, the display data stored in a memory for display, which is integral to the display unit 10d, is moved to the storage unit 10f. In this way, the display data stored in the storage unit 10f can be reviewed on the display unit 10d later. When various types of moving image data sent from the moving image transmission device 20 is displayed on the display unit 10d, display data of frame images constituting the moving image is stored in the memory for display. With the screen shot function provided by the OS, the display data can be moved to the storage unit 10f, and then sent to other moving image display devices.

In order to prevent such fraudulent acts, the moving image display program according to this embodiment stores display data (modified frame image), which is obtained by adding noise to a key frame image of an original moving image, in the display memory of the display unit 10. As such, even though the screen shot function provided by the OS is used, only the modified frame image can be moved to the storage unit 10f. In this regard, a plurality of types of modified frame images are prepared, and an average value of the modified frame images matches the key frame image. As such, the plurality types of modified frame images are switched at short intervals and sequentially displayed, whereby the user recognizes as if the original key frame image without noise is displayed on the display unit 10d.

Figure 3:
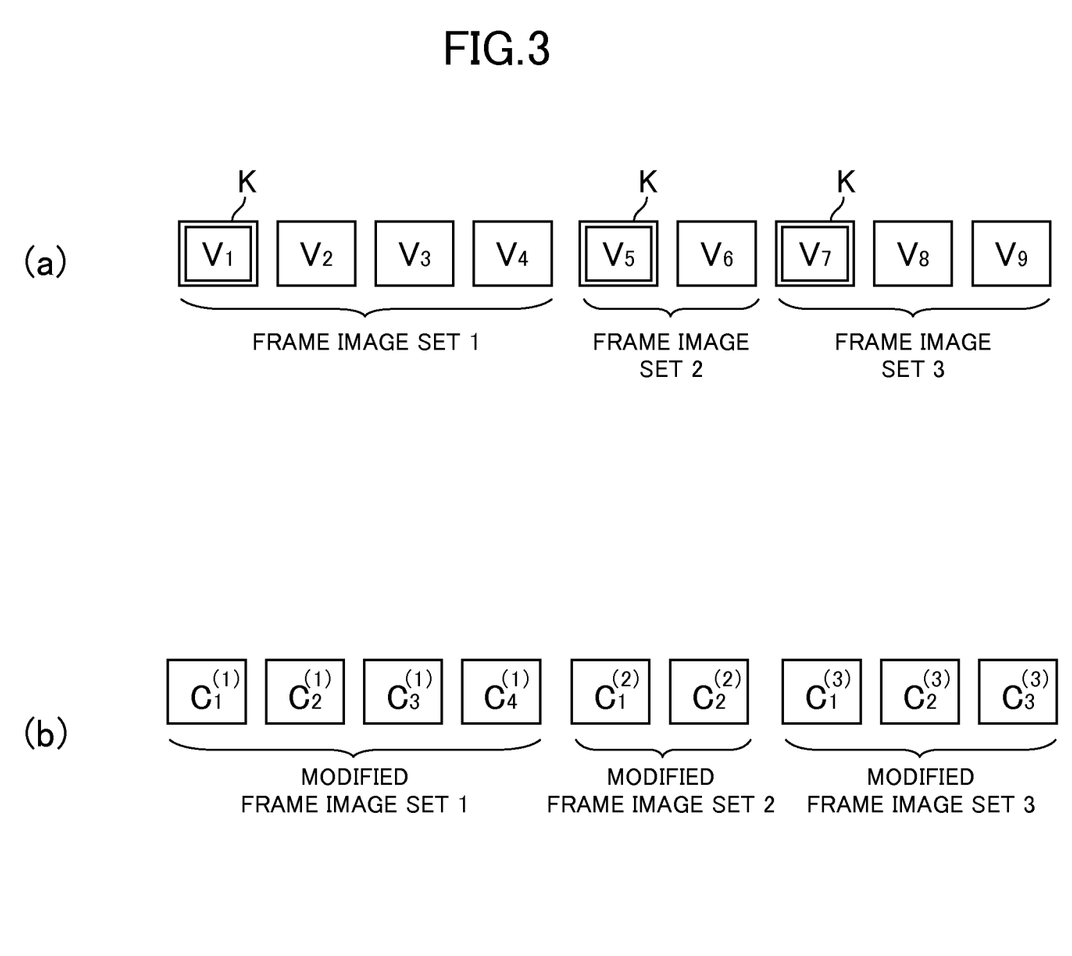
FIG. 3 is a diagram illustrating conversion of moving images.

FIG. 3 is a diagram illustrating conversion of moving images by the moving image display program. FIG. 3(*a*) shows a series of frame images indicated by the moving image data sent from the moving image transmission device 20, and FIG. 3(*b*) shows a series of modified frame images generated by the moving image display program. As shown in FIG. 3(*a*), the moving image data sent from the moving image transmission device 20 indicates a large number of frame images V1, V2, V3, V4 . . . that are sequentially displayed at predetermined time intervals. The moving image display program selects a frame image $V_j$ with a noticeable change from these frame images as a key frame image K. Here, frame images $V_1$, $V_5$, and $V_7$ are selected as key frame images K. Subsequently, successive frame images from a key frame image K to a frame image immediately before a next key frame image K are specified as a frame image set. For example, in FIG. 3(*a*), the frame images $V_1$ to $V_4$ are specified as a frame image set 1, and the frame image $V_1$ at the top is specified as the key frame image K. The frame images belonging to one frame image set have no prominent differences, and are recognized as similar images by the user.

As shown in FIG. 3(*b*), the moving image display program converts a key frame images K into the same number of modified frame images as the frame image number R of the frame image set to which the key frame image K belongs. For example, the frame image number R of the frame image set 1 is four, and the frame image set 1 including the frame images $V_1$ to $V_4$ is converted into the modified frame image set 1 including the same number of modified frame images $C_1^{(1)}$ to $C_4^{(1)}$. These four modified frame images $C_1^{(1)}$ to $C_4^{(1)}$ are respectively generated based on the frame image $V_1$, which is the key frame image K. Similarly, the frame image number R of the frame image set 2 is two, and the frame image set 2 including the frame images $V_5$ to $V_6$ is converted into the modified frame image set 2 including the same number of modified frame images $C_1^{(2)}$ and $C_2^{(2)}$. These two modified frame images $C_1^{(2)}$ and $C_2^{(2)}$ are respectively generated based on the frame image $V_5$, which is the key frame image K. A frame image set is converted into a modified frame image set that includes the same number of modified frame images as the frame images of the frame image set, and thus the length of the moving image is not changed. As discussed above, the frame images belonging to one frame image set have no prominent differences, and are recognized as the similar images by the user. On the other hand, the user recognizes the modified frame images that belong to the corresponding modified frame set image set as if the key frame image is displayed for the same length as the modified frame images. These recognitions are similar to each other, which does not provide a feeling of strangeness to the user.

In the following, a method for generating a given number of modified frame images $C_j$ based on a key frame image K will be described in detail.

Figure 4:
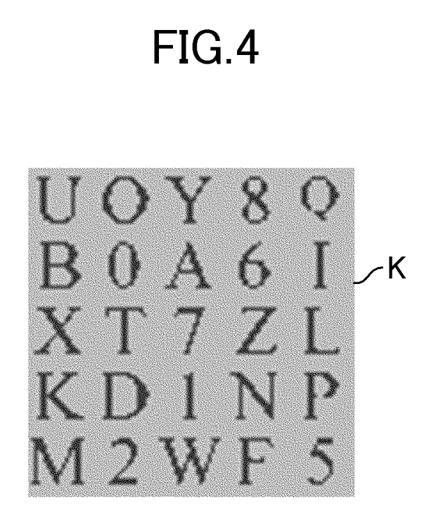
FIG. 4 illustrates an example of a key frame image.

FIG. 4 illustrates an example of a key frame image K. Here, the key frame image K is a 256-level gray scale image, and a person is displayed on a gray background. For the sake of description, FIG. 4 illustrates large alphabet letters and numbers instead of a person.

If a pixel value of a position (x,y) on the key frame image K is K (x,y), such pixel value is in the range of 0 to 255 inclusive. A pixel value K (x,y) at a position in the background is 1 or more and less than 255, and may be, for example, 30 or so. On the other hand, a pixel value K (x,y) at a position of the person is greater than such value, and may be, for example, 100 to 200.

The moving image display program of the moving image display device 10 specifies a frame image set, and determines a key frame image K and a frame image number R of the frame image set to which the key frame image K belongs. Subsequently, a modified frame image set S is generated based on the key frame image K. Here, the image set S includes R (R≥2) types of modified frame images $C_j$ (j=1 to R).

Specifically, the moving image display program generates R types of noise images $N_j$ (j=1 to R), and adds the generated noise images to the key frame image K, thereby obtaining R types of modified frame images $C_j$ (j=1 to R). The moving image display program first generates R types of intermediate noise images $M_j$ (j=1 to R) in order to generate R types of noise images $N_j$, and then converts the generated intermediate noise images into R types of noise images $N_j$. In this regard, the moving image display program randomly determines the intermediate noise images $M_j$ and the noise images N under the condition described later.

Figure 5:
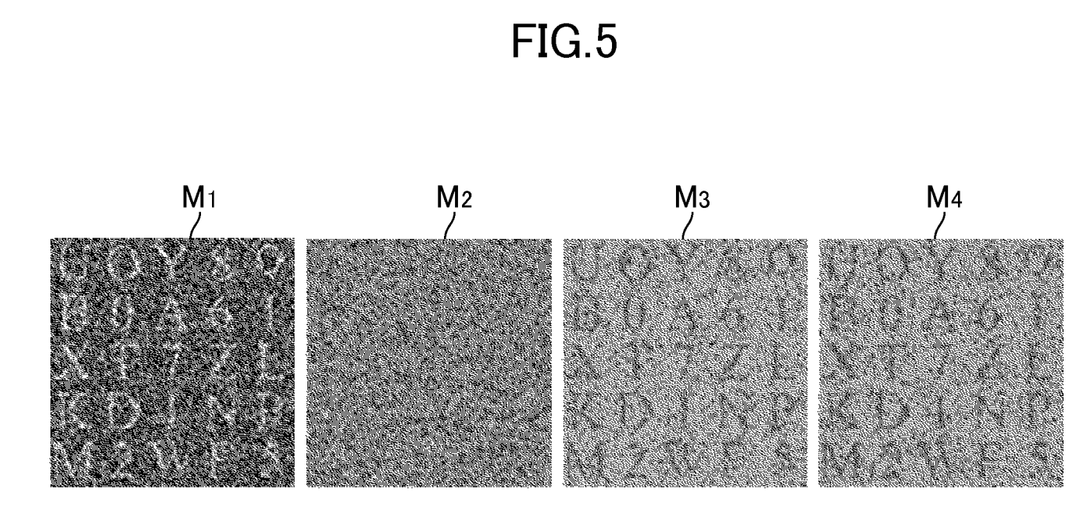
FIG. 5 illustrates an example of an intermediate noise image.
Figure 6:
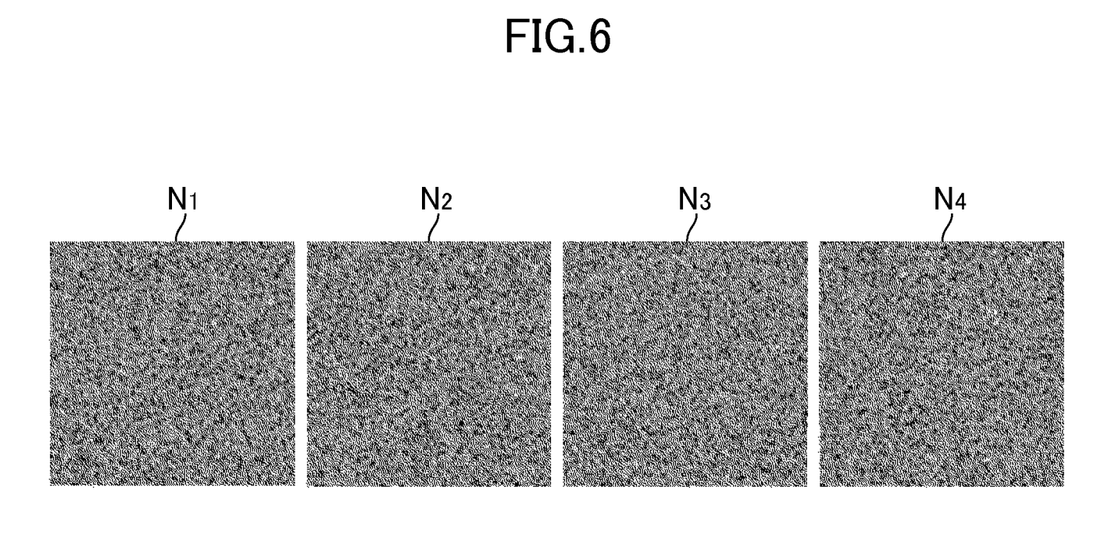
FIG. 6 illustrates an example of a noise image.
Figure 7:
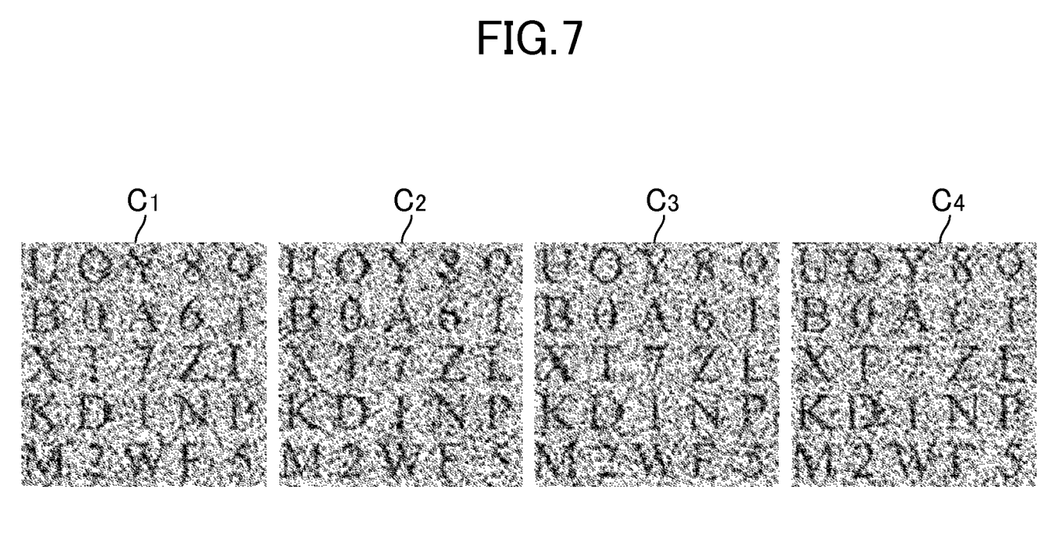
FIG. 7 illustrates an example of a modified frame image.

FIGS. 5 to 7 respectively show examples of intermediate noise images $M_1$ to $M_4$, noise images $N_1$ to N4, and modified frame images $C_1$ to $C_4$, where R=4. Here, horizontal and vertical sizes (dimensions) of the noise image $N_j$, the intermediate noise image $M_j$, the modified image $C_j$, and the key frame image K are the same, and each image is a 256-level gray scale image.

When the pixel value of the noise image $N_j$ at the position (x,y) is $N_j$ (x,y), and the pixel value of the modified frame image $C_j$ at the position (x,y) is $C_j$ (x,y), the following expression (1) is satisfied.

$$C_j(x,y)=K(x,y)+N_j(x,y) \tag{1}$$

When all of the R types of noise images $N_j$ are viewed while being switched at short intervals, viewers perceive as if no image is displayed due to the human visual system. That is, the following expression (2) is satisfied at any position (x,y) of the noise image $N_j$.

$$\Sigma N_j(x,y)=0 \tag{2}$$

Here, Σ is a sum from j=1 to j=R. Since the equations (1) and (2) are satisfied, the average of pixel values $C_j$ (x,y) at any position (x,y) of the modified frame image $C_j$ matches the pixel value K (x,y) of the position (x,y) of the key frame image K. In this regard, there is an upper limit of R in order that the human visual system works effectively. According to the experiment of the present inventors, the upper limit of R is about 2 to 4.

As described above, the modified frame image $C_j$ also has 256 levels, and needs to be represented by pixel values displayable on the display unit 10d. As such, the following expression (3) must be satisfied.

$$\alpha \leq K(x,y)+N_j(x,y) \leq \beta \quad (3)$$

Here, $\alpha$ is the lower limit value of a pixel value displayable by the display unit 10d, and $\beta$ is the upper limit value of a pixel value displayable by the moving image display device 10. The display unit 10d performs 256-level grayscale display, and thus the lower limit value $\alpha$ is 0, and the upper limit value $\beta$ is 255.

Upon generating a modified frame image set S, the moving image display program of the moving image display device 10 displays modified frame images $C_1$ to $C_n$ included in the modified frame image set S in order.

Figure 8:
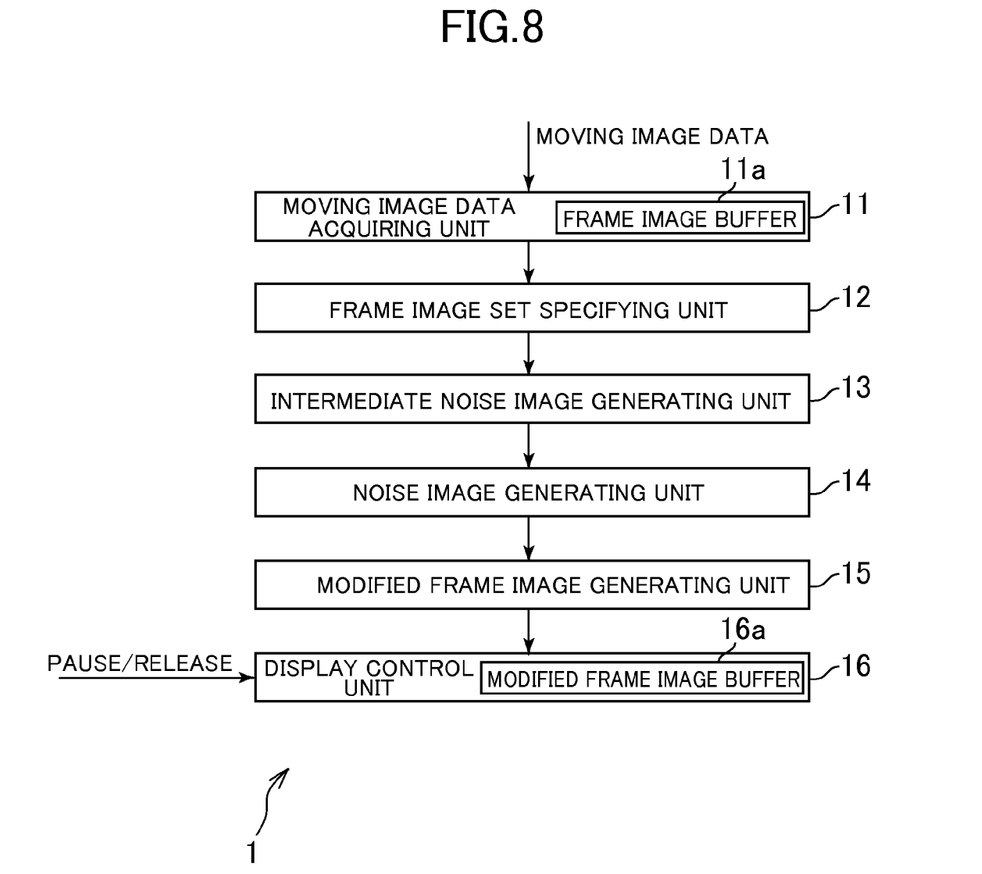
FIG. 8 is a functional block diagram of the moving image display device.

FIG. 8 is a functional block diagram of the moving image display device 10. The functional block diagram shown in FIG. 8 indicates the functions that the moving image display device 10 has and are related to display of moving images. The functions shown in FIG. 8 are implemented by the moving image display device 10, which is a computer, executing the moving image display program.

As shown in FIG. 8, the moving image display device 10 includes a moving image data acquiring unit 11, a frame image set specifying unit 12, an intermediate noise image generating unit 13, a noise image generating unit 14, a modified frame image generating unit 15, a display control unit 16, and a display unit 17. The moving image data acquiring unit 11 includes, for example, a FIFO (First In First Out) frame image buffer 11a reserved in the main memory 10b. The display control unit 16 includes, for example, a FIFO modified frame image buffer 16a reserved in the main memory 10b.

The moving image data acquiring unit 11 receives moving image data sent from the moving image transmission device 20. The moving image data acquiring unit 11 then acquires a series of frame images indicated in the moving image data, and stores the acquired frame images in order in the frame image buffer 11a. The frame image set specifying unit 12 specifies a plurality of frame image sets, each including successive frame images of similar content, based on the frame images stored in the frame image buffer 11a. Each frame image set is temporally adjacent to another frame image set, and all the frame images stored in the frame image buffer 11a respectively belong to the frame image sets.

The frame image set specifying unit 12 then outputs key frame images K, each being a representative image of each frame image set, and frame image numbers R of respective frame image sets. The intermediate noise image generating unit 13, the noise image generating unit 14, and the modified frame image generating unit 15 sequentially generate the modified frame image sets S. A modified frame image set S includes a frame image number R, which is output by the frame image set specifying unit 12, of modified frame images $C_j$, which are obtained by converting the key frame image K output from the frame image set specifying unit 12.

That is, the intermediate noise image generating unit 13 generates the frame image number R of intermediate noise images $M_j$ based on the key frame image K. The noise image generating unit 14 generates noise images $N_j$ based on the intermediate noise images $M_j$. As shown in the expression (1), the modified frame image generating unit 15 adds noise images $N_j$ generated by the noise image generating unit 14 to the key frame image K, thereby generating the frame image number R of modified frame images $C_j$. The modified frame images $C_j$ according to respective frame image sets S are stored in the modified frame image buffer 16a in order of display. The display control unit 22 sequentially displays the modified frame images $C_j$ of the respective modified frame image sets S stored in the modified frame image buffer 16a. When reproducing the frame images is paused using the input unit 10e, the modified frame image set S being reproduced at that time is repeatedly displayed. In this way, the original frame image is not stored in the memory for display, and fraudulent acts can be prevented while reproducing the frame images is paused.

Figure 9:
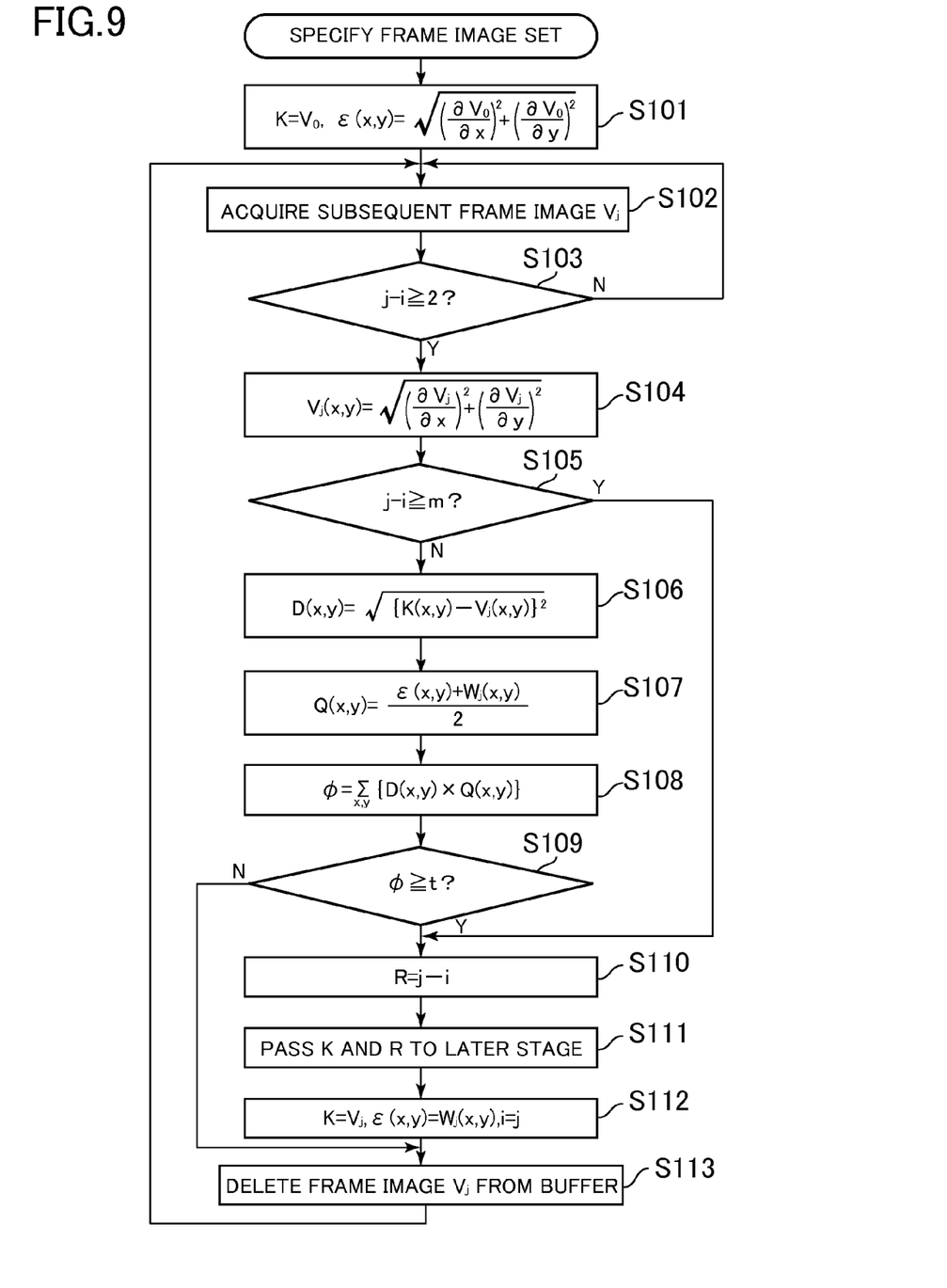
FIG. 9 is a flow chart illustrating processing for specifying a frame image set.

Here, processing of the frame image set specifying unit 12 will be discussed in detail. FIG. 9 is a flow chart showing the processing of the frame image set specifying unit 12. In FIG. 9, K represents a key frame image, and $V_j$ is jth frame image. Further, a gradient evaluation value $\epsilon$ (x,y) indicates a gradient at a position (x,y) of the key frame image K, and a gradient evaluation value $W_j$ indicates a gradient at a position (x,y) of the frame image $V_j$, and are respectively shown by the following expressions (4) and (5).

$$\epsilon(x,y)=\{(\partial V_0/\partial x)^2+(\partial V_0/\partial y)^2\}^{1/2} \quad (4)$$

$$W_j(x,y)=\{(\partial V_j/\partial x)^2+(\partial V_j/\partial y)^2\}^{1/2} \quad (5)$$

A difference evaluation value D (x,y) indicates a difference between a pixel value at a position (x,y) of the key frame image K and a pixel value at a position (x,y) of the frame image $V_j$, and is shown by the following expression (6). The difference evaluation value D (x,y) indicates how the frame image $V_j$ is different from the key frame image K at the position (x,y).

$$D(x,y)=[\{K(x,y)-V_j(x,y)\}^2]^{1/2} \quad (6)$$

Further, a gradient evaluation value Q (x,y) is shown by the following expression (7). The value Q (x,y) indicates an average value of gradients of respective key frame image K and frame image $V_j$ at the position (x,y). When the value Q is larger, an image frequency at the position (x,y) is higher.

$$Q(x,y)=\{\epsilon(x,y)+W_j(x,y)\}/2 \quad (7)$$

An index $\phi$ is an index for determining whether a frame image $V_j$ is noticeably changed from a key frame image K preceding the frame image $V_j$, and defined by the following expression (8).

$$\phi=\Sigma\{D(x,y)\times Q(x,y)\} \quad (8)$$

Here, $\Sigma$ represents the sum of the positions (x,y). The value of index $\phi$ is larger as the number of positions (x,y), at which both of a difference evaluation value D (x,y) and a gradient evaluation value Q (x,y) are large, is increased. That is, when the number of positions in a key frame image K and a frame image $V_j$, at which image frequency is high, is greater and a change from the key frame image K to the frame image $V_j$ in these positions is greater, the value of index $\phi$ is larger.

In FIG. 9, the frame image set specifying unit 12 selects a first frame image $V_0$ as a key frame image K, and then calculates gradient evaluation values $\epsilon$ (x,y) for all of positions (x,y) (S101). Alternatively, the frame image set specifying unit 12 initializes variables i and j to 0.

Next, the frame image set specifying unit 12 increments the variable j, and acquires a subsequent frame image V from the frame image buffer 11a (S102). The frame image set specifying unit 12 then determines whether j−i is equal to or more than 2 (S103). If NO in S103, the processing returns to S102. If Yes in S103, the frame image set specifying unit 12 calculates a gradient evaluation value $W_j$ (x,y) (S104). Subsequently, the frame image set specifying unit 12 determines whether j−i is equal to or more than m (S105). Here, m is the maximum number of frame image number R included in the frame image sets, and may be set to a number in the range of, for example, 2 or more to 4 or less as discussed above.

If Yes in S105, the processing proceeds to S110. If No in S105, the frame image set specifying unit 12 calculates difference evaluation values D (x,y), gradient evaluation values Q (x,y), and indexes φ for all of positions (x,y) (S106, S107, S108). Subsequently, the frame image set specifying unit 12 determines whether the index φ is equal to or more than τ (S109). τ may be determined by an experiment, for example.

If No in S109, the processing proceeds to S113. If Yes in S109, the frame image set specifying unit 12 sets the frame image number R to j−i (S110), and passes the frame image number R and the key frame image K selected at S101 to the intermediate noise image generating unit 13 (S111). Subsequently, the frame image set specifying unit 12 selects a frame image V as the next key frame image K, and sets gradient evaluation values $W_j$ (x,y) to the gradient evaluation value ε (x,y) for all positions (x,y). Further, the frame image set specifying unit 12 sets the variable i to the same value as the variable j (S112). The frame image set specifying unit 12 then deletes the frame image $V_j$ from the frame image buffer 11a (S113), and returns to S102.

As a result of the foregoing processing, the frame image set specifying unit 12 can preferably specify the frame image set based on D (x,y) indicating a change in the frame image $V_j$ and Q (x,y) indicating content characteristics. Here, although the index φ is used for specifying the key frame image K, other methods may be employed for specifying the key frame image K. For example, the frame image set specifying unit 12 may take a difference between a frame image $V_j$ and a previous frame image $V_j$−1, and when the difference is a predetermined value or more, select the frame image $V_j$ as a key frame image K. In the above example, although a first frame image of each frame image set is selected as a key frame image K, other frame images, such as a center frame image, may be selected as a key frame image K. Alternatively, images generated based on the frame image included in the frame image set, such as an average image of frame images included in the frame image set, may be selected as a key frame image K.

Figure 10:
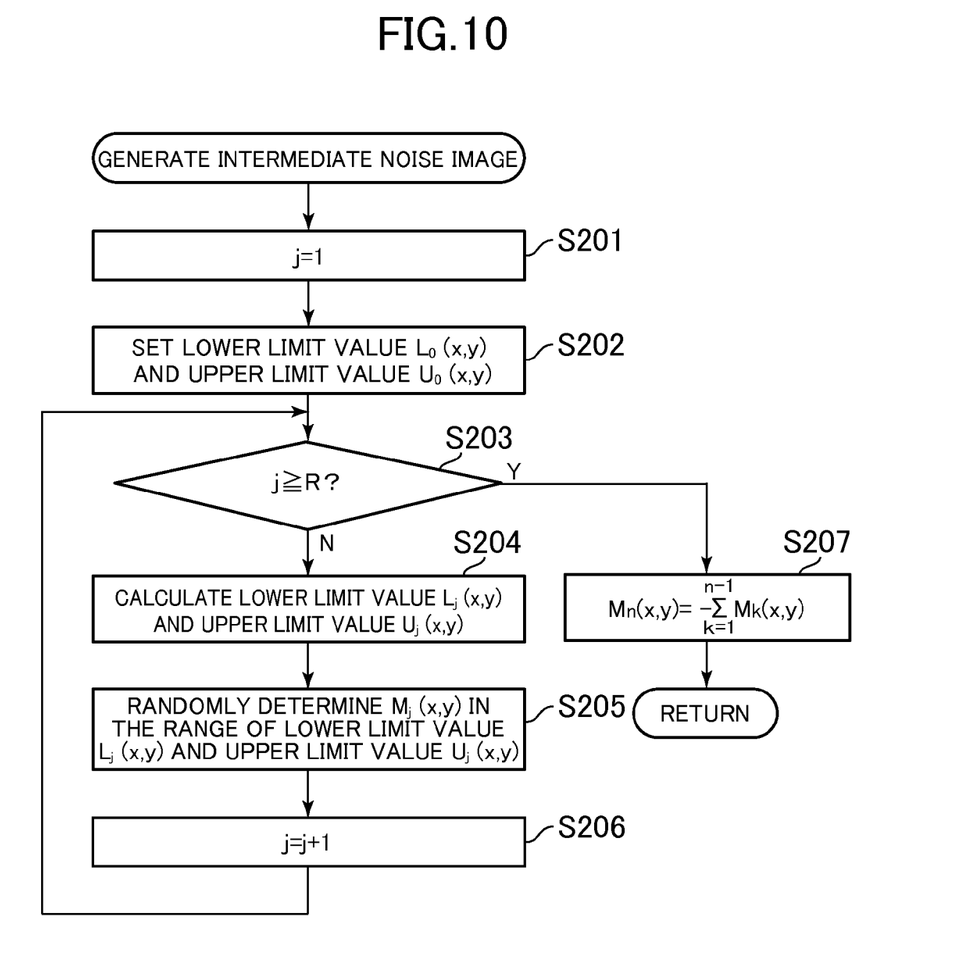
FIG. 10 is a flow chart illustrating processing for generating an intermediate noise image.

Next, processing performed by the intermediate noise image generating unit 13 will be discussed in detail. FIG. 10 is a flow chart illustrating the processing performed by the intermediate noise image generating unit 13. As shown in FIG. 10, upon receiving the key frame image K and the frame image number R from the frame image set specifying unit 12, the intermediate noise image generating unit 13 sets the variable j to 1 (S201). The intermediate noise image generating unit 13 then calculates $L_0$ (x,y) and $U_0$ (x,y), which respectively are initial values of the lower limit value $L_j$ (x,y) and the upper limit value $U_j$ (x,y), in the allowable range of pixel values $M_j$ (x,y) of intermediate images $M_j$ described later, for all positions (x,y) based on the following expressions (9) and (10) (S202).

$$L_0(x,y)=\alpha-K(x,y) \quad (9)$$

$$U_0(x,y)=\beta-K(x,y) \quad (10)$$

Subsequently, if the variable j is not equal to or more than R (S203), the intermediate noise image generating unit 13 calculates the lower limit values $L_j$ (x,y) and the upper limit values $U_j$ (x,y) of pixel values $M_j$ (x,y) for all positions (x,y) based on the following expressions (11) and (12) (S204). Here, ε is a sum from k=1 to j−1.

$$L_j(x,y)=-\Sigma M_k(x,y)-(n-j)U_{j-1}(x,y) \quad (11)$$

$$U_j(x,y)=-\Sigma M_k(x,y)-(n-j)L_{j-1}(x,y) \quad (12)$$

The intermediate noise image generating unit 13 then randomly determines M (x,y) in the range of the lower limit value $L_j$ (x,y) and the upper limit value $U_j$ (x,y) (S205). Specifically, the intermediate noise image generating unit 13 generates random numbers γ in the range of 0 to 1 for all positions (x,y), and calculates pixel values $M_j$ (x,y) by substituting the γ for the following expression (13).

$$M_j(x,y)=\gamma \times L_j(x,y)+(1-\gamma) \times U_j(x,y) \quad (13)$$

Subsequently, the intermediate noise image generating unit 13 increments the variable j by 1 (S206), and returns to the processing of S203. If it is determined that the variable j is R or more in S203, the intermediate noise image generating unit 13 calculates $M_n$ (x,y) for all positions (x,y) based on the following expression (14) (S207), and finishes the processing. Here, Σ is a sum from k=1 to n−1.

$$M_n(x,y)=\Sigma M_k(x,y) \quad (14)$$

The pixel value $M_j$ (x,y) of the intermediate noise image $M_j$ satisfies the following expression (15) similarly to the pixel value $N_j$ (x,y) of the noise image $N_j$. Here, Σ is a sum from j=1 to n.

$$\Sigma M_j(x,y)=0 \quad (15)$$

The expression (14) is derived from the expression (15). The M (x,y) is a value obtained by inverting the sign of the sum of $M_1$ (x,y) to $M_{j-1}$ (x,y), which have been determined in the processing of S205, and $M_{j-1}$ (x,y) to $M_n$ (x,y), which are to be determined in the subsequent processing of S205. Here, assuming that the upper limit value and the lower limit value of $M_{j+1}$ (x,y) to $M_n$ (x,y), which are to be determined in the processing of S205, respectively are $U_{j-1}$ (x,y) and $L_{j-1}$ (x,y), and this leads to the expressions (11) and (12).

Figure 11:
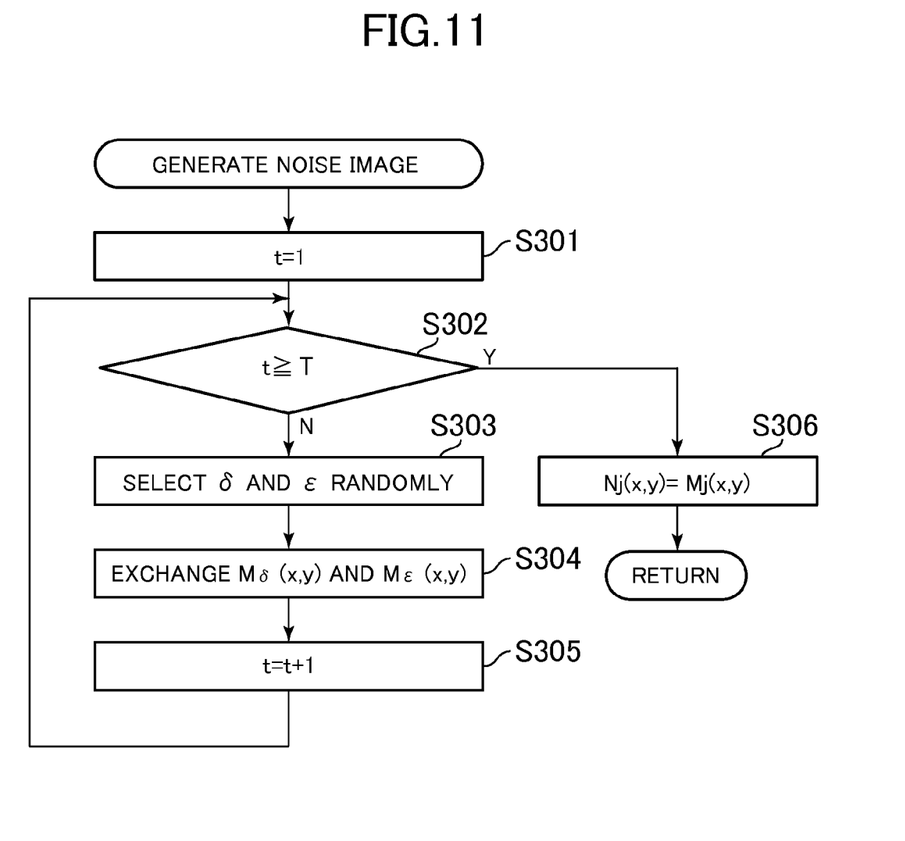
FIG. 11 is a flow chart illustrating processing for generating a noise image.

Next, processing of the noise image generating unit 14 will be explained in detail. FIG. 11 is a flow chart illustrating processing executed by the noise image generating unit 14. The processing in FIG. 11 shows that the pixel values $M_1$ (x,y) to $M_n$ (x,y) at the positions (x,y) of the intermediate noise images $M_1$ to $M_n$ are randomly exchanged and thereby the pixel values $N_1$ (x,y) to $N_n$ (x,y) at the positions (x,y) of the noise images $N_1$ to $N_n$ are obtained. The processing shown in FIG. 11 is repeated with respect to all the positions (x,y). In this processing, the noise image generating unit 14 sets the variable t to 1 (S301), generates two random numbers in the range of 1 to R unless the variable t is not equal to or more than T, which is the predetermined number of repetition times (S302), and sets variable δ and variable ε to the generated numbers (S303). Subsequently, the noise image generating unit 14 exchanges the pixel value $M_\delta$ (x,y) of the δth intermediate noise image $M_\delta$ and the pixel value $M_\epsilon$ (x,y) of the εth intermediate noise image $M_\epsilon$ (S304). The noise image generating unit 14 then increments the variable t by 1 (S305), and returns to the processing of S302. In the processing of S302, if it is determined that the variable t is equal to or more than the repetition times T, the pixel values $M_1$ (x,y) to $M_n$ (x,y) of the intermediate noise images $M_1$ to $M_n$ are set to the pixel values $N_1$ (x,y) to $N_n$ (x,y) of the noise images $N_1$ to $N_n$.

Subsequently, the processing of S301 to S306 is repeated for all of the positions (x,y). The number of the repetition times T may be any number, but preferably equal to or more than R.

As discussed above, the modified frame image generating unit 15 adds noise images N generated by the frame image set specifying unit 12 to key frame images K output from the noise image generating unit 14, thereby generating the frame image number R of modified frame images $C_j$. Subsequently, the modified frame image generating unit 15 stores the generated modified frame images $C_j$ in the modified frame image buffer 16a in order of display. The display control unit 22 stores the modified frame images $C_j$ of the modified frame image sets S, which are stored in the modified frame image buffer 16a, in the memory for display provided to the display unit 10d in order of display, thereby sequentially displaying the modified frame images $C_j$.

According to the moving image display device 10 described above, the modified frame image sets S are sequentially generated, and the modified frame images $C_j$ included in the modified frame image sets S are displayed in time order. The original frame image $V_j$ is not displayed on the display unit 10d, and thus it is possible to prevent a fraudulent copy of data of frame images $V_j$.

The present invention is not limited to the above described embodiment, and various modifications can be made. For example, while in the above discussion a 256-level gray scale image is used as a frame image $V_j$, other type of image (e.g., color image) may of course be used. Further, a method for generating the modified frame images $C_j$ is not limited to the above-described examples, and various generation methods can be used. For example, according to the embodiment described above, a modified frame image $C_j$ is acquired by adding noise to an entire key frame image K. However, a modified frame image $C_j$ may be acquired by adding noise to a part of a key frame image K. For example, an area showing particular content, such as a human face, may be specified in the key frame image K, and only such area may be added with noise. In this case, pixel values $M_j$ (x,y) and pixel values $N_j$ (x,y) are values greater than 0 only at the positions (x,y) in the specified area, and are set to 0 at the other positions (x,y).

Further, in the above discussion, the moving image processing system according to the present invention is implemented in the moving image display device 10, but may be implemented in the moving image transmission device 20. In this case, the moving image transmission device 20 generates modified frame images, and sends the generated modified frame images in a streaming form or a downloading form to the moving image display device 10. The moving image display device 10 sequentially displays the received modified frame images. Alternatively, the moving image transmission device 20 may generate noise images, and send the generated noise images together with the original moving image data to the moving image display device 10 in a streaming form or a downloading form. In this case, the moving image display device 10 generates modified frame images by combining the frame images indicated by the received moving image data with the received noise images, and sequentially displays the modified frame images. The functions of the moving image processing system according to the present invention may be shared by some computers in various ways.

The invention claimed is:

1. A moving image processing system comprising:
   at least one processor; and
   at least one memory device that stores a plurality of instructions, which when executed by the at least one processor, causes the at least one processor to execute operations comprising:
   acquiring moving image data;
   specifying an image set that includes, among a plurality of frame images indicated by the moving image data, frame images to be displayed sequentially; and
   generating, by modifying a key frame image that is based on at least one of the frame images included in the image set, a same number of modified frame images as the frame images included in the image set, an average of pixel values of corresponding pixels of the modified frame images being corresponding to a pixel value of a corresponding pixel of the key frame image, and the modified frame images being sequentially displayed instead of the frame images included in the image set.

2. The moving image processing system according to claim 1, wherein
   the operations comprise specifying the image set based on a change in the frame images indicated by the moving image data.

3. The moving image processing system according to claim 1, wherein
   the operations comprise specifying the image set based on content of the frame images indicated by the moving image data.

4. The moving image processing system according to claim 1, wherein the operations further comprise:
   repeating, in a case where reproducing the moving image data is paused while the modified frame images are sequentially displayed, displaying a plurality of pause modified frame images for use in pausing in order, the pause modified frame images being obtained by modifying a pause key frame image for use in pausing that is based on at least one of the frame images included in the image set, an average of pixel values of corresponding pixels of the pause modified frame images being corresponding to a pixel value of a corresponding pixel of the pause key frame image.

5. The moving image processing system according to claim 4, wherein
   the paused modified frame images are the modified frame images.

6. The moving image processing system according to claim 1, wherein
   when a pixel value at a position (x, y) of a key frame image K is K (x,y), a pixel value at a position (x,y) of jth modified image $C_j$ is $C_j$ (x,y), and a pixel value at a position (x,y) of jth noise image $N_j$ is $N_j$ (x,y), the following expression is established:

$$K(x,y)+N_j(x,y)=C_j(x,y)$$

$$\Sigma N_j(x,y)=0$$

where n is a number of the modified frame images, and $\Sigma$ is a sum from j=1 to n.

7. The moving image processing system according to claim 6, wherein the following expression is established:

$$\alpha \leq N_j(x,y)+K(x,y) \leq \beta$$

where $\alpha$ is a lower limit value of a pixel value displayable by a display, and $\beta$ is a upper limit value of a pixel value displayable by the display.

8. The moving image processing system according to claim 7, wherein
   when a pixel value at a position (x,y) of jth intermediate noise image $M_j$ is $M_j$ (x,y), a lower limit value $L_j$ (x,y) and a upper limit value $U_j$ (x,y) of the pixel value are sequentially calculated by $$L_j(x,y)=-\Sigma M_k(x,y)-(n-j)U_{j-1}(x,y)$$

$$U_j(x,y)=-\Sigma M_k(x,y)-(n-j)L_{j-1}(x,y)$$

the pixel value $M_j$ (x,y) is determined within a range of the lower limit value $L_j$ (x,y) and the upper limit value $U_j$ (x,y), and the plurality of modified frame images $C_j$ are generated based on the pixel value $M_j$ (x,y), where Σ is a sum from k=1 to j−1, $U_0$ (x,y) is β−K (x,y), and $L_0$ (x,y) is α−K (x,y).

9. The moving image processing system according to claim 8, wherein a pixel value $M_δ$ (x,y) at a position (x,y) of δth intermediate noise image $M_δ$ and a pixel value $M_ϵ$ (x,y) at a position (x,y) of ϵth intermediate noise image $M_ϵ$ are interchanged so as to generate the plurality of noise images $N_j$, and whereby the plurality of modified frame images $C_j$ are generated, where δ ands ϵ are random numbers in a range of 1 to n inclusive.

10. A moving image processing method comprising:

acquiring using a first processor, moving image data;

specifying using the first processor an image set that includes, among a plurality of frame images indicated by the moving image data, frame images to be displayed sequentially; and generating using the first processor, by modifying a key frame image that is based on at least one of the frame images included in the image set, a same number of modified frame images as the frame images included in the image set, an average of pixel values of corresponding pixels of the modified frame images being corresponding to a pixel value of a corresponding pixel of the key frame image, and the modified frame images being sequentially displayed instead of the frame images included in the image set.

11. A non-transitory computer readable storage medium storing a program for causing a computer to function as:

acquiring means for acquiring moving image data;

specifying means for specifying an image set that includes, among a plurality of frame images indicated by the moving image data, frame images to be displayed sequentially; and generating means for generating, by modifying a key frame image that is based on at least one of the frame images included in the image set, a same number of modified frame images as the frame images included in the image set, an average of pixel values of corresponding pixels of the modified frame images being corresponding to a pixel value of a corresponding pixel of the key frame image, and the modified frame images being sequentially displayed instead of the frame images included in the image set.

\* \* \* \* \*